(12) United States Patent
Ohms et al.

(10) Patent No.: US 8,943,891 B2
(45) Date of Patent: *Feb. 3, 2015

(54) YAW-RATE SENSOR

(75) Inventors: Torsten Ohms, Vaihingen/Enz-Aurich (DE); Burkhard Kuhlmann, Reutlingen (DE); Robert Sattler, Regensburg (DE); Rolf Scheben, Stuttgart (DE); Daniel Christoph Meisel, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

This patent is subject to a terminal disclaimer.

(21) Appl. No.: 13/365,740

(22) Filed: Feb. 3, 2012

(65) Prior Publication Data

US 2012/0247206 A1 Oct. 4, 2012

(30) Foreign Application Priority Data

Mar. 30, 2011 (DE) .......................... 10 2011 006 394

(51) Int. Cl.
*G01C 19/56* (2012.01)
*G01C 19/5747* (2012.01)

(52) U.S. Cl.
CPC .................................. *G01C 19/5747* (2013.01)
USPC ...................................................... 73/504.12

(58) Field of Classification Search
USPC ...................................................... 73/504.12
See application file for complete search history.

(56) References Cited

U.S. PATENT DOCUMENTS

| 6,705,164 | B2* | 3/2004 | Willig et al. | ............... | 73/504.12 |
| 6,752,017 | B2* | 6/2004 | Willig et al. | ............... | 73/504.04 |
| 7,134,337 | B2* | 11/2006 | Willig et al. | ............... | 73/504.12 |
| 2012/0125099 | A1* | 5/2012 | Scheben et al. | ............ | 73/504.12 |

FOREIGN PATENT DOCUMENTS

DE 10108196 10/2002

* cited by examiner

*Primary Examiner* — Helen Kwok
(74) *Attorney, Agent, or Firm* — Kenyon & Kenyon LLP

(57) ABSTRACT

A yaw-rate sensor and a method for operating a yaw-rate sensor having a first Coriolis element and a second Coriolis element are proposed, the yaw-rate sensor having a substrate having a main plane of extension, the yaw-rate sensor having a first drive element for driving the first Coriolis element in parallel to a second axis, the yaw-rate sensor having a second drive element for driving the second Coriolis element in parallel to the second axis, the yaw-rate sensor having detection means for detecting deflections of the first Coriolis element and of the second Coriolis element in parallel to a first axis due to a Coriolis force, the second axis being situated perpendicularly to the first axis, the first and second axis being situated in parallel to the main plane of extension, the first and second drive elements being mechanically coupled to each other via a drive coupling element.

9 Claims, 6 Drawing Sheets

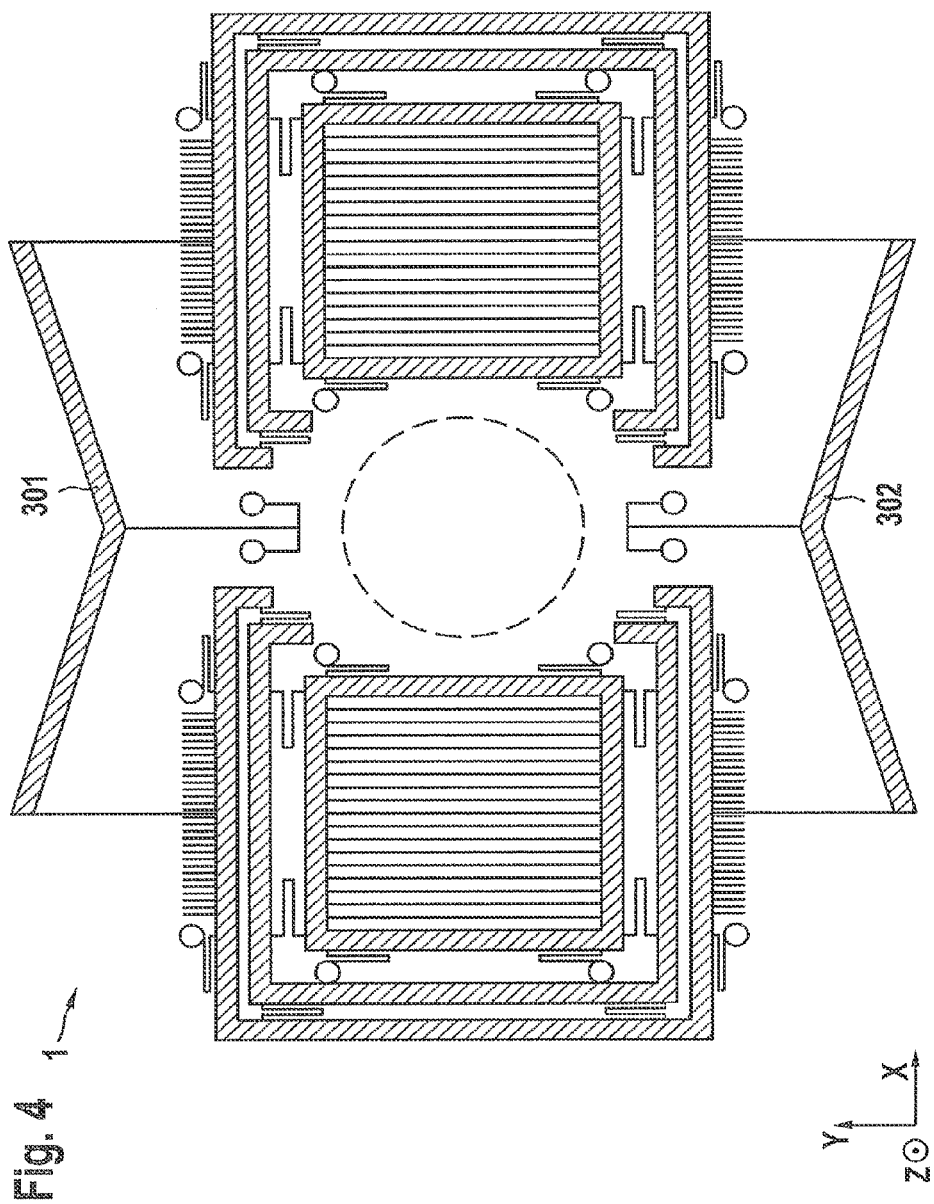

YAW-RATE SENSOR

CROSS REFERENCE

The present application claims the benefit under 35 U.S.C. §119 of German Patent Application No. DE 102011006394.3 filed on Mar. 30, 2011, which is expressly incorporated herein by reference in its entirety.

FIELD OF THE INVENTION

The present invention is directed to a yaw-rate sensor.

BACKGROUND INFORMATION

A yaw-rate sensor is described in German Patent No. DE 10108196 A1, the yaw-rate sensor having Coriolis elements which are surrounded by drive elements, which are each cut out on the sides facing each other. The Coriolis elements and the drive elements are connected by springs. The drive elements are connected to bearing blocks with the aid of springs. Furthermore, movable electrodes, stationary electrodes, and bearing blocks for the stationary electrodes are provided. The two Coriolis elements are connected with the aid of a coupling spring. To detect the deflection of the Coriolis elements, a frame-shaped detection element is provided inside each frame-shaped Coriolis element. The detection elements are also designed as rectangular frame structures which are connected to the substrate with the aid of spring elements having bearing blocks. The spring elements are soft in the X direction and rigid in the Y direction, thus allowing the detecting frames to deflect generally only in the X direction. The detecting frames are connected to the corresponding Coriolis elements via spring elements. The spring elements are designed to be soft in the Y direction and rigid in the X direction and transmit the Coriolis forces in the X direction. Grid-shaped detecting electrodes are situated inside the detecting frames. A yaw rate having an axis of rotation perpendicular to the substrate (Z direction) results in an action of forces causing an antiparallel and collinear detection oscillation of the Coriolis elements along the X axis. The Coriolis elements participate in this oscillation and transmit their motion to the detection oscillators (detection elements); the drive elements do not participate in the detection oscillation. The two detection elements are coupled to each other with the aid of a structure situated between them. This structure couples both the driving motion and the detection motion of the Coriolis elements. In addition to the so-called useful modes (drive mode and detection mode), the conventional yaw-rate sensor also has additional oscillation modes, so-called interference modes, which disadvantageously result in superimpositions of the useful modes and may result in erroneous signals.

It is an object of the present invention to provide a yaw-rate sensor in which the interference modes are largely suppressed or the interference modes are at relatively high frequencies.

SUMMARY

An example yaw-rate sensor according to the present invention and an example method according to the present invention for operating a yaw-rate sensor may have the advantage that the interference modes are largely suppressed or are at relatively high frequencies, whereby a relatively distinct separation in the frequency ranges between useful modes and interference modes is achievable. This advantageously makes a relatively minor excitation of the interference modes possible, so that the operation of the yaw-rate sensor is relatively stable.

The yaw-rate sensor is preferably designed as a microelectromechanical system (MEMS). The substrate is preferably a semiconductor substrate and is particularly preferably made of a silicon material. The excitation of the oscillation of the Coriolis elements preferably occurs with the aid of electrostatic comb drives on the drive elements. The Coriolis force is preferably detected due to the fact that the Coriolis element and/or a detection element has/have movable electrodes, which are situated opposite stationary electrodes.

According to one preferred refinement it is provided that the drive coupling element has a first drive coupling subelement and a second drive coupling subelement, the first drive coupling subelement and/or the second drive coupling subelement preferably having a bar structure and, particularly preferably, a T-shaped structure and/or a V-shaped structure. This advantageously allows a relatively good separation of interference and useful modes. By using two drive coupling subelements, which are situated preferably symmetrically to the longitudinal axis of the axis of rotation, a relatively stable operation is possible.

According to another preferred refinement it is provided that the drive coupling element is mechanically coupled to the substrate. This allows a relatively good separation of interference and useful modes and a relatively stable operation of the yaw-rate sensor. Fastening to the substrate allows the interference modes to be shifted to relatively high frequencies.

According to another preferred refinement it is provided that the drive coupling element is designed to be softer regarding rotation about a third axis than regarding rotation about the first axis, the third axis being situated perpendicularly to the main plane of extension, the drive coupling element being designed to be more rigid in the second axis than in the first axis. The antiparallel useful mode is thus advantageously shifted to low frequencies and the parallel interference mode is shifted to high frequencies.

According to another preferred refinement, it is provided that the detector has a first detection subelement and a second detection subelement, the first detection subelement and the second detection subelement being mechanically coupled to each other via a detection coupling element. By coupling of the detection subelements it is advantageously achieved that the antiparallel useful mode is shifted to low frequencies and the parallel interference mode is shifted to high frequencies.

According to another preferred refinement it is provided that the detection coupling element is mechanically coupled to the substrate. Fastening to the substrate allows the interference modes to be shifted to relatively high frequencies.

According to another preferred refinement it is provided that the detection coupling element has at least one first detection coupling subelement and one second detection coupling subelement, the first detection coupling subelement and/or the second detection coupling subelement preferably having a bar structure and, particularly preferably, an L-shaped structure and/or a T-shaped structure. By using multiple detection coupling subelements it is advantageously achieved that the antiparallel useful mode is shifted to low frequencies and the parallel interference mode is shifted to high frequencies.

According to another preferred refinement, it is provided that the detection coupling element is designed to be softer regarding rotation about a third axis than regarding rotation about the first axis, the detection coupling element being designed to be more rigid in the second axis than in the first axis. The antiparallel useful mode is thus advantageously shifted to low frequencies and the parallel interference mode is shifted to high frequencies.

The present invention also relates to a method for operating a yaw-rate sensor having a first Coriolis element and a second Coriolis element and having a substrate having a main plane of extension, the first Coriolis element being excited by a first exciting element to a first oscillation in parallel to a second axis, the second Coriolis element being excited by a second exciting element to a second oscillation in parallel to the second axis, the first excitation element being connected to a first drive element, the second excitation element being connected to a second drive element, deflections of the first Coriolis element and of the second Coriolis element in parallel to a first axis being detected by a detector, the second axis being situated perpendicularly to the first axis, the first axis and the second axis being situated in parallel to the main plane of extension, the first oscillation and the second oscillation being mechanically coupled to each other via a drive coupling element.

Exemplary embodiments of the present invention are illustrated in the figures and explained in greater detail below.

BRIEF DESCRIPTION OF THE DRAWINGS

FIG. 4 shows a yaw-rate sensor according to another specific embodiment of the present invention.

DETAILED DESCRIPTION OF EXAMPLE EMBODIMENTS

Figure 1:
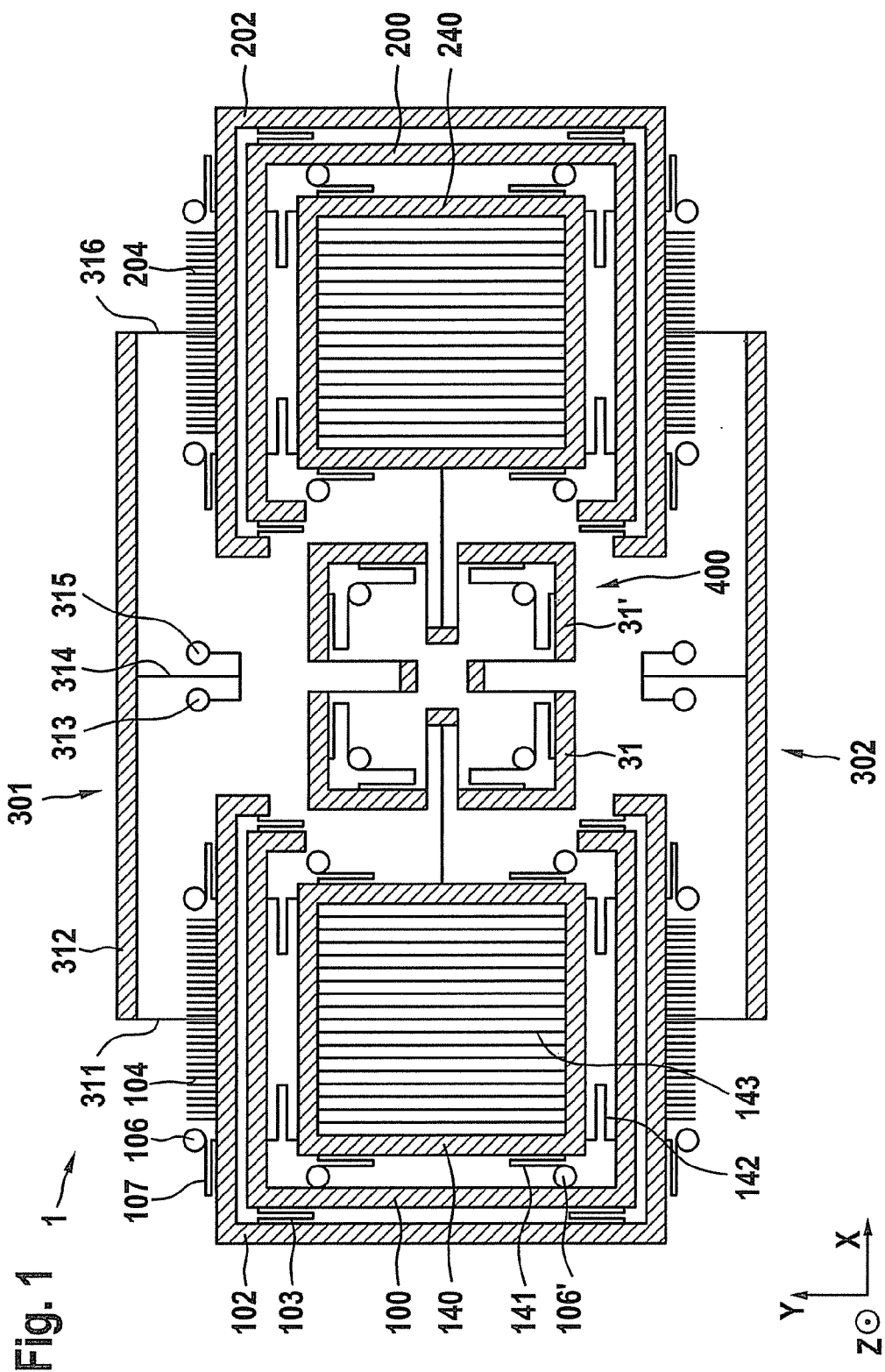
FIG. 1 shows a yaw-rate sensor according to an exemplary specific embodiment of the present invention.

In the different figures, identical parts are provided with identical reference numerals and are therefore normally named or mentioned only once.

FIG. 1 shows a yaw-rate sensor 1 according to an exemplary specific embodiment of the present invention. In FIG. 1, a top view of a substrate (not illustrated in greater detail) is shown having a main plane of extension (X-Y plane), in which a first Coriolis element 100 and a second Coriolis element 200 are situated. First and second Coriolis elements 100, 200, are designed as frame-shaped structures, which are each cut out on the sides facing each other. Coriolis elements 100, 200 are surrounded by drive elements 102, 202 which are each cut out on the sides facing each other. The yaw-rate sensor has a symmetric design, so that in the following, when possible, only the left-hand side of the yaw-rate sensor will be described for the sake of simplicity. The right-hand side has a design which is symmetric to the left-hand side. Coriolis element 100 and drive element 102 are connected via bending springs 103. Bending springs 103 are designed to be soft in the X direction and rigid in the Y direction. Drive element 102 is connected to bearing blocks 106, which are fixedly connected to the substrate, with the aid of springs 107. Springs 107 are designed to be soft in the Y direction and soft in the X direction. Movable electrodes 104, 204, which mesh comb-like with the stationary electrodes (not illustrated), which are fixedly connected to the substrate via bearing blocks (not illustrated), are situated on drive elements 102, 202.

By applying electrical voltages between the movable electrodes 104, 204 and the stationary electrodes, drive elements 102, 202 are excited to oscillations. Accordingly, Coriolis elements 100, 200 are also excited to oscillations. The centers of gravity of Coriolis elements 100, 200 then move on an axis which is parallel to the Y axis. The movements of both Coriolis elements 100, 200 therefore take place in axes which run in parallel to each other. In this case, the centers of gravity move without the effect of a Coriolis force (i.e., without a rotary motion of the substrate about an axis which stands perpendicularly on the substrate) on straight lines which are parallel to each other. If the substrate happens to rotate about the Z axis, i.e., about the axis which stands perpendicularly on the substrate, Coriolis forces, which are perpendicular to axis of rotation Z and perpendicular to axis of movement Y act on each of Coriolis elements 100, 200. These forces then act in the X direction.

Movable electrodes 104, 204, together with the stationary electrodes and drive elements 102, 202, thus form the excitation element, by which Coriolis elements 100, 200 are excited to oscillations, during which the axes of oscillation of the centers of gravity are oriented in parallel to each other. Drive elements 102, 202 are driven linearly and in phase opposition in the X-Y plane.

To detect the deflection of Coriolis elements 100, 200 in the Z direction (perpendicular to the X-Y plane), frame-shaped detection elements 140, 240 are provided inside each of frame-shaped Coriolis elements 100, 200. Detection elements 140, 240 are designed as rectangular frame structures which are connected to the substrate with the aid of spring elements 141 having bearing blocks 106'. Spring elements 141 are designed to be soft in the X direction and rigid in the Y direction. Detecting frames 140, 240 are connected to corresponding Coriolis elements 100, 200 via spring elements 142. Spring elements 142 are designed to be soft in the Y direction and rigid in the X direction and thus transmit the Coriolis forces particularly well in the X direction. Grid-shaped detecting electrodes 143 (only indicated) are situated inside detecting frames 140, 240. Grid-shaped detecting electrodes 143 are situated between stationary electrodes (not illustrated), which are fastened to the substrate by bearings and do not move with respect to the substrate.

According to an example embodiment of the present invention, first drive element 102 and second drive element 202 are connected to each other via a drive coupling element having drive coupling subelements 301, 302. In this exemplary embodiment, drive coupling subelements 301, 302 have a symmetric design; therefore only drive coupling subelement 301 will be described in detail. Drive coupling subelement 301 has a non-bending bar 312 and three bendable bars 311, 314, 316, which are fixedly connected to the substrate via bearing points 313, 315. Bar 312 is fixedly connected to drive elements 102, 202 via bars 311, 316. Coupling via drive coupling subelements 301, 302 advantageously achieves the antiparallel oscillation mode (useful mode) being of a lower frequency than the parallel oscillation mode.

Frame-shaped detection elements 140, 240 are preferably connected to each other via a detection coupling element 400 having four detection coupling subelements 31, 31' of the same type (also referred to hereinafter as deflection structures), which are situated symmetrically to each other with respect to two axes of symmetry and which are described in detail in the figures below. Coupling detection elements 140, 240 via detection coupling element 400 advantageously achieves the antiparallel oscillation mode (useful mode) being of a lower frequency than the parallel oscillation mode.

One preferred specific embodiment is a yaw-rate sensor in which the Coriolis frames are open and the detection elements are connected to each other with the aid of a special coupling structure (coupling cross). This coupling structure has four L-shaped or T-shaped deflection angles and one central substrate connection. As a result of the specific embodiment, interference modes are suppressed in the sense that their frequency is higher than that of the useful modes. This improved separation of useful modes and interference modes in the frequency range results in a lower excitation of the interference modes and thus in a stable operation. The drive movements of the two partial oscillators are coupled via separate (T-shaped) coupling structures between the Coriolis oscillators.

The yaw-rate sensor preferably has at least two drive oscillators having comb structures, which are moved linearly and in phase opposition in the plane and are coupled with the aid of coupling structures, so that the antiparallel oscillation mode has a lower frequency than the parallel oscillation mode. Preferably, there are at least two Coriolis oscillators, which are moved linearly in the plane. Furthermore, there are preferably at least two detection oscillators, which are moved linearly in the plane and/or are coupled with the aid of a coupling cross, which has at least one substrate connection, so that the antiparallel oscillation mode has a lower frequency than the parallel oscillation mode (useful modes=antiparallel oscillation types).

The drive oscillators are preferably coupled to each other with the aid of deflection/coupling structures. These structures have bending bars and rigid bars and a substrate connection. The detection oscillators are preferably directly coupled to each other with the aid of a structure situated between them (coupling cross). The coupling cross is in turn preferably made up of four deflection structures, each of which executes a rotary motion. The deflection structures (T- or L-shaped) are preferably suspended on Ti springs or on simple bending bars, which meet in the center and are anchored to the substrate. The detection oscillators move linearly toward or away from each other. Due to the special shape of the coupling cross, the antiparallel oscillation mode has a lower frequency than the parallel oscillation mode.

The yaw-rate sensor preferably has coupling structures for collinear (i.e., oscillating toward or away from each other) in phase opposition movements (so-called coupling cross). The yaw-rate sensor preferably also has coupling structures for non-collinear (i.e., passing by each other) antiparallel (in phase opposition) movements. Alternatively, it is possible that drive movement and detection movement are reversed (inverse operation). The Coriolis elements are designed preferably as frames; particularly preferably, the frames are open and the drive elements are mechanically coupled with the aid of a T-shaped structure.

Figure 2A:
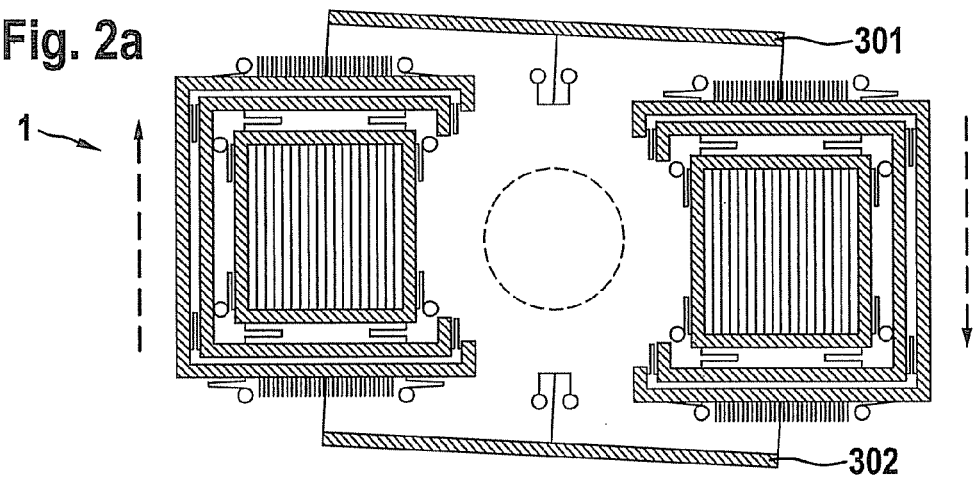
FIGS. 2a, 2b, 2c show a yaw-rate sensor according to another specific embodiment of the present invention.
Figure 2B:
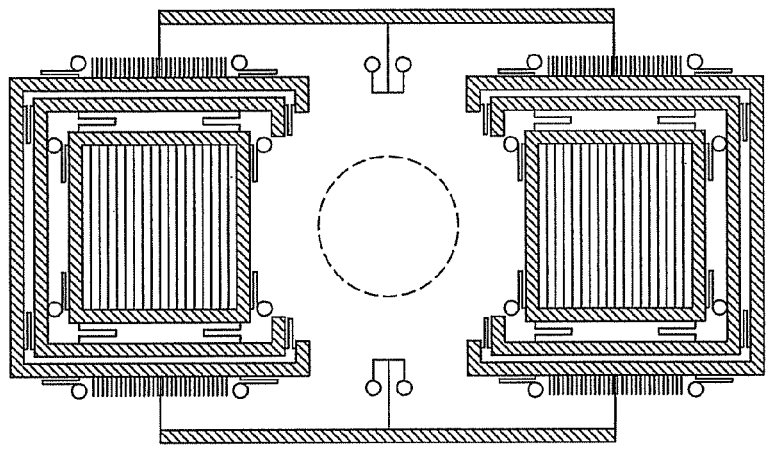
Figure 2C:
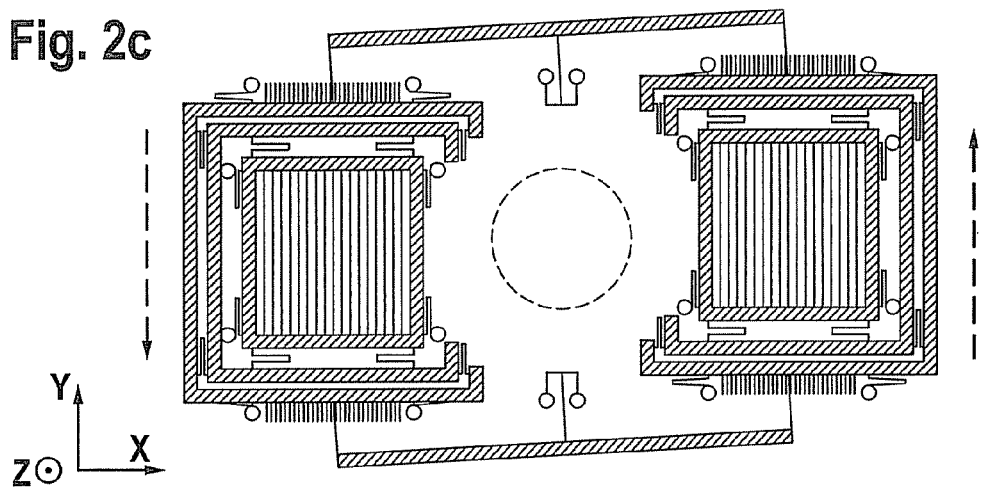

FIGS. 2a, 2b, 2c show a yaw-rate sensor according to an example embodiment of the present invention in three different oscillation positions of the drive movement. The dashed arrows denote the direction of movement of the drive structures. An optional detection coupling element, which is not described in detail here, is indicated as a dashed circle. At point in time t=0 the yaw-rate sensor is in the position illustrated in FIG. 2a. At point in time t=T/4 (T stands for one oscillation period), the yaw-rate sensor is in the position illustrated in FIG. 2b. At point in time t=T/2, the yaw-rate sensor is in the position illustrated in FIG. 2c.

Figure 3A:
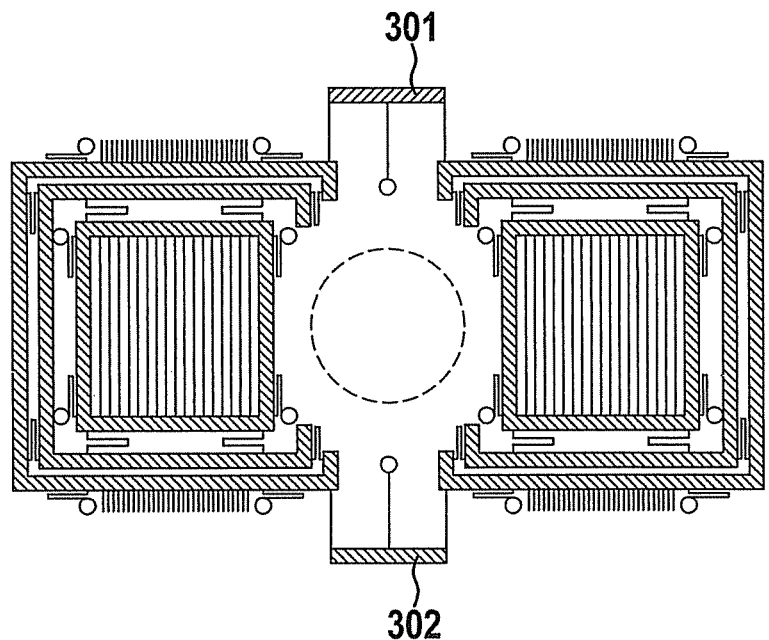
FIGS. 3a, 3c show a yaw-rate sensor according to two other specific embodiments of the present invention.

FIG. 3a shows a yaw-rate sensor according to another specific embodiment of the present invention. An optional detection coupling element, which is not described in detail here, is indicated as a dashed circle. Compared to the specific embodiment of FIG. 1, drive coupling subelements 301, 302 are smaller, i.e., the distance of the fastening points on the drive elements is relatively small. This advantageously makes a relatively compact design of drive coupling subelements 301, 302 possible. In this exemplary embodiment, drive coupling subelements 301, 302 are situated generally outside of the area which is surrounded by drive elements 102, 202. FIG. 3c shows a yaw-rate sensor according to another specific embodiment of the present invention. Compared to the specific embodiment of FIG. 3a, drive coupling subelements 301, 302 are situated generally within the area which is surrounded by drive elements 102, 202. This advantageously makes a relatively compact design of the yaw-rate sensor possible. The T-shaped coupling structures are preferably situated relatively close to each other and, particularly preferably, are situated between the drive elements.

Figure 3B:
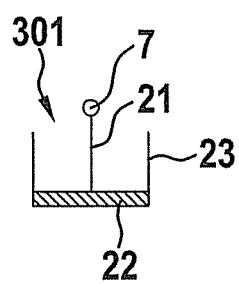
FIG. 3b shows a detailed view of another specific embodiment of the present invention.
Figure 3C:
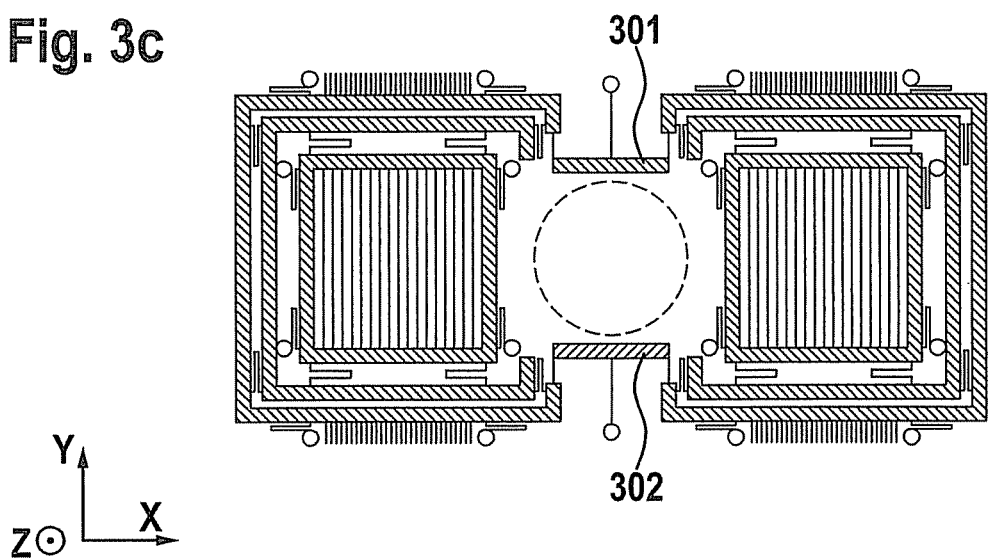

FIG. 3b shows a detailed view of drive coupling subelement 301 according to an exemplary specific embodiment. T-shaped elements 301 are made of a bending bar 21, which is fastened to the substrate via an anchor point 7. A rigid bar 22 is centrally adjacent and transverse to the other end of bending bar 21; at the ends of rigid bar 22 there are other bending bars 23, which are mounted on the drive elements.

FIG. 4 shows a yaw-rate sensor according to another specific embodiment of the present invention. An optional detection coupling element, which is not described in detail here, is indicated as a dashed circle. In this specific embodiment, drive coupling subelements 301, 302 have a V-shaped design.

Figure 5A:
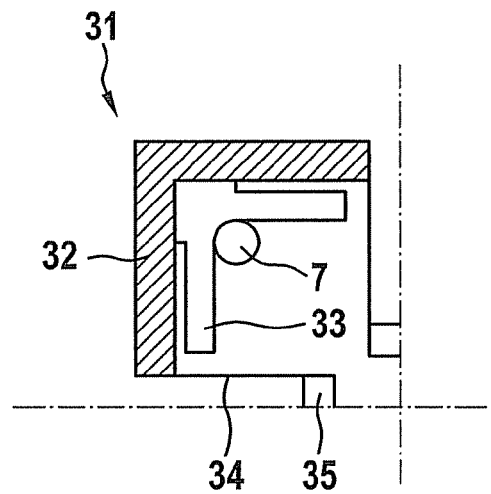
FIG. 5a, 5b, 5c show detailed views of other specific embodiments of the present invention.
Figure 5B:
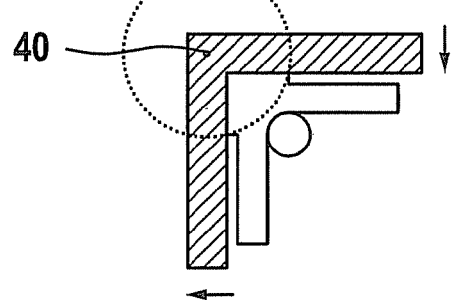
Figure 5C:
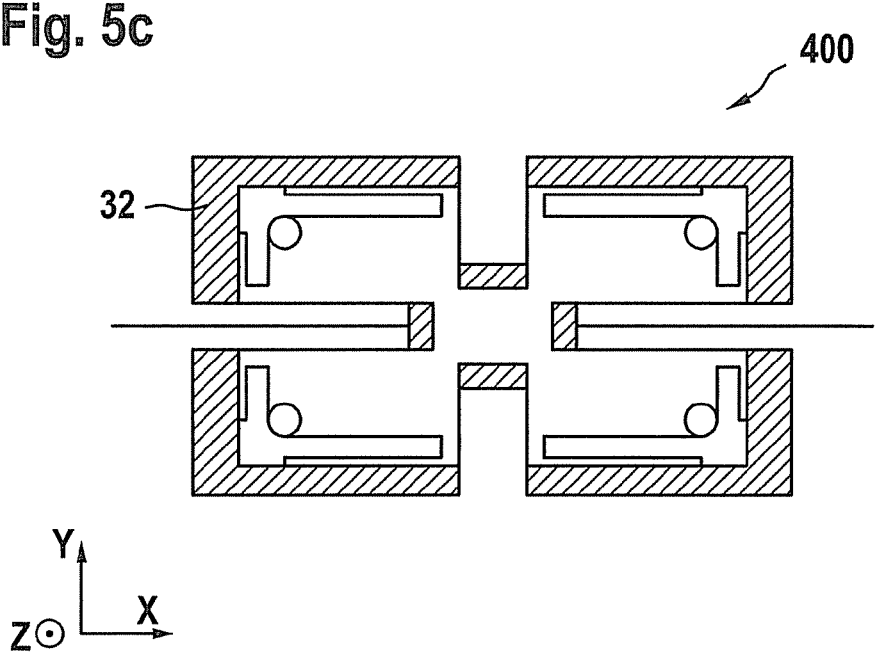

FIGS. 5a, 5b, 5c show detailed views of other specific embodiments of the present invention. FIG. 5a shows a detection coupling subelement 31 (deflection structure), for example, of detection coupling element 400 of FIG. 1. Detection coupling subelement 31 has an L-shaped rigid bar 32 having identical legs. Bar 32 is fixedly connected to the substrate via two U springs 33, which meet at the center (bearing point 7). The ends of bar 32 are connected to bending bars 34, which end in non-bending bars 35. These detection coupling subelements 31 transmit a rotary motion about center of rotation 40 (FIG. 5b). FIG. 5c shows an alternative specific embodiment of detection coupling element 400, detection coupling element 400 having detection coupling subelements having unequal legs as bars 32.

Figure 6A:
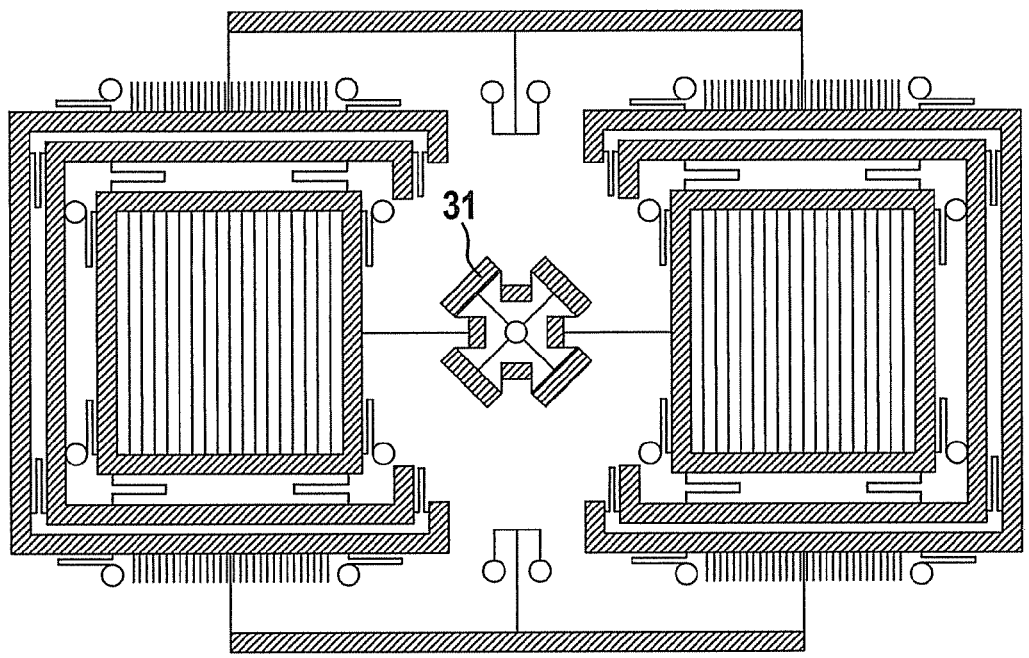
FIG. 6a shows a yaw-rate sensor according to another specific embodiment of the present invention.
Figure 6B:
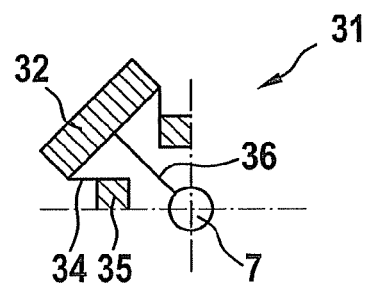
FIGS. 6b, 6c show detailed views of other specific embodiments of the present invention.
Figure 6C:
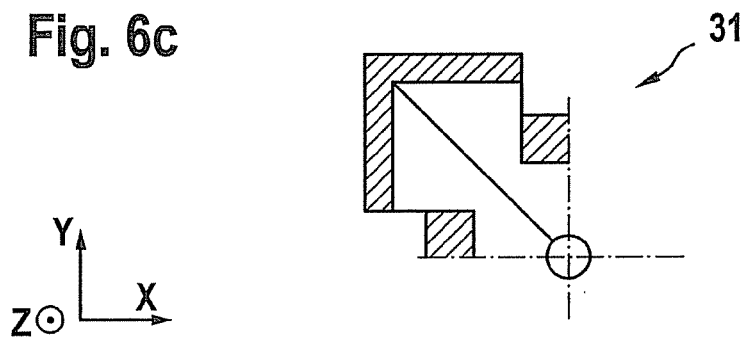

FIG. 6a shows a yaw-rate sensor according to another exemplary specific embodiment. Compared to the specific embodiment of FIG. 1, the detection coupling element is formed by detection coupling subelements 31, which, as apparent from the detailed view of FIG. 6b, have a straight non-bending bar 32 and are anchored in the center on the substrate via a bending bar 36 (bearing point 7). Alternatively, the non-bending bar may have an L-shaped design (FIG. 6c).

What is claimed is:

1. A yaw-rate sensor, comprising:
a first Coriolis element;
a second Coriolis element;
a substrate having a main plane of extension;
a first drive element to drive the first Coriolis element in parallel to a second axis;
a second drive element to drive the second Coriolis element in parallel to the second axis, the first drive element and the second drive element being mechanically coupled to each other via a drive coupling element; and
a detection element to detect deflections of the first Coriolis element and the second Coriolis element in parallel to a first axis due to a Coriolis force, the first axis being situated perpendicularly to the second axis, the first axis and the second axis being situated in parallel to the main plane of extension;

wherein the drive coupling element is mechanically coupled directly to the substrate.

2. The yaw-rate sensor as recited in claim 1, wherein the drive coupling element has a first drive coupling subelement and a second drive coupling subelement.

3. The yaw-rate sensor as recited in claim 2, wherein at least one of the first drive coupling subelement and the second drive coupling subelement has a bar structure.

4. The yaw-rate sensor as recited in claim 1, wherein the drive coupling element is softer regarding a rotation about a third axis than regarding a rotation about the first axis, the third axis being situated perpendicularly to the main plane of extension, the drive coupling element being more rigid along the second axis than along the first axis.

5. The yaw-rate sensor as recited in claim 1, wherein the detection element has a first detection subelement and a second detection subelement, the first detection subelement and the second detection subelement being mechanically coupled to each other via a detection coupling element.

6. The yaw-rate sensor as recited in claim 5, wherein the detection coupling element is mechanically coupled to the substrate.

7. The yaw-rate sensor as recited in claim 5, wherein the detection coupling element has at least one first detection coupling subelement and one second detection coupling subelement, at least one of the first detection coupling subelement and the second detection coupling subelement having a bar structure.

8. The yaw-rate sensor as recited in claim 5, wherein the detection coupling element is softer regarding a rotation about a third axis than regarding a rotation about the first axis, the detection coupling element being more rigid along the second axis than along the first axis.

9. A method for operating a yaw-rate sensor having a first Coriolis element, a second Coriolis element, and a substrate having a main plane of extension, the method comprising:

exciting the first Coriolis element by a first drive element to a first oscillation in parallel to a second axis;

exciting the second Coriolis element by a second drive element to a second oscillation in parallel to the second axis;

detecting deflections of the first Coriolis element and of the second Coriolis element in parallel to a first axis by a detection element, the second axis being situated perpendicularly to the first axis, the first axis and the second axis being situated in parallel to the main plane of extension; and mechanically coupling the first oscillation and the second oscillation to each other via a drive coupling element;

wherein the drive coupling element is mechanically coupled directly to the substrate.

* * * * *